Dec. 31, 1963  E. D. UNDERWOOD, JR  3,115,862
LEAKAGE INDICATOR FOR SAFETY RELIEF VALVES
Filed Aug. 28, 1961
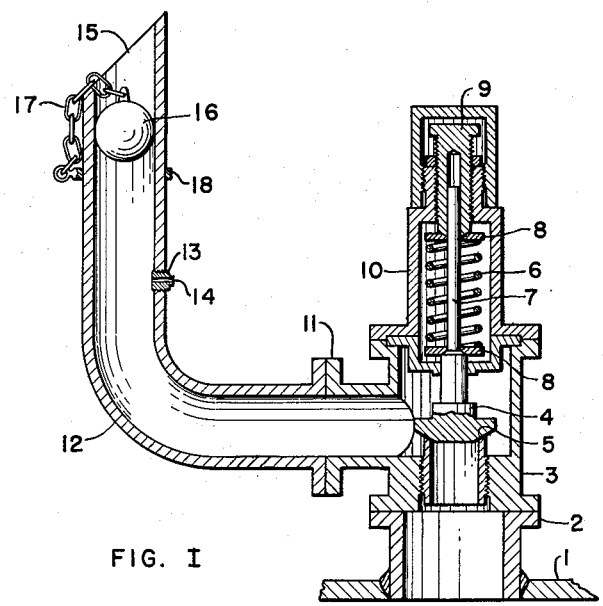
FIG. I
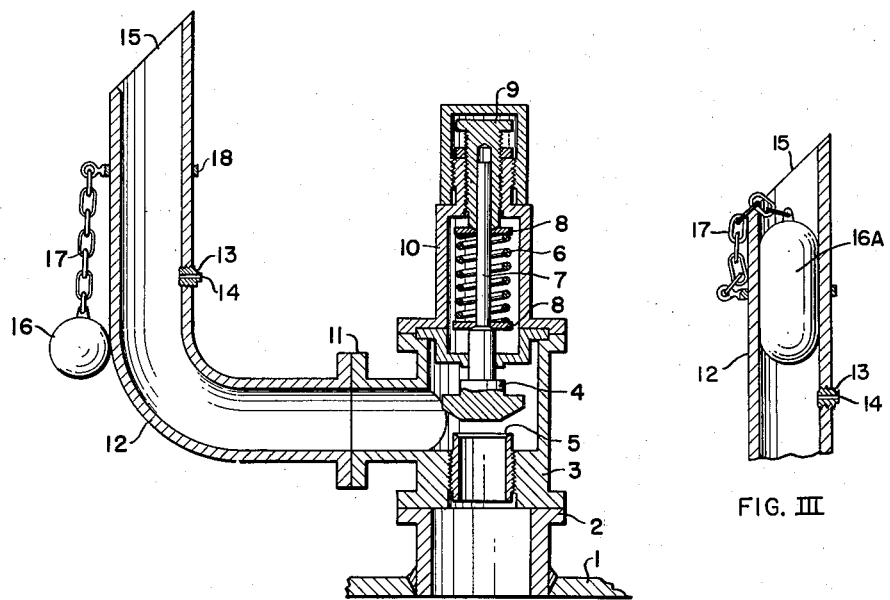
FIG. II
FIG. III
INVENTOR:
EDWIN D. UNDERWOOD, JR.
BY: H. D. Busch
HIS ATTORNEY

3,115,862
LEAKAGE INDICATOR FOR SAFETY RELIEF VALVES
Edwin D. Underwood, Jr., East Alton, Ill., assignor to Shell Oil Company, New York, N.Y., a corporation of Delaware
Filed Aug. 28, 1961, Ser. No. 134,505
5 Claims. (Cl. 116—114)

This invention relates to leak detecting devices and has particular reference to a detector for revealing leakage in the relief or safety valves attached to pressure equipment.

Pressure equipment such as used in oil refining and in chemicals manufacture, namely, fractionating columns, receivers, and other parts of the plant having vapors or gases under pressure are usually provided with pressure relief valves or safety relief valves. These valves are as a rule set to open upon the pressure in the vessel or piping reaching a maximum value. The safety relief valves often discharge directly to the atmosphere; in other cases the valves discharge into a piping whereby the vented vapors are collected. In both cases there is a loss of pressure to the process system and in the first case a loss of valuable product with the concomitant pollution of the atmosphere.

It is an object of this invention to provide a simple and effective device whereby excessive loss from safety relief valves of the above type can be readily ascertained.

It is a further object of this invention to provide a means which automatically signals when gaseous material is escaping at beyond a predetermined rate from a pressurized system.

The further objects of the invention will be readily apparent from the following detailed description of one embodiment of my invention which is illustrated in the accompanying drawing of which:

FIG. I is a sectional view taken on a vertical plane through the apparatus showing the device in place prior to signalling.

FIG. II is a similar view to FIG. I showing the signal in operation.

FIG. III is a fragmentary view of the device showing the end of the vent pipe and a modified embodiment of the plug.

Referring to the drawing, 1 represents part of the wall of a pressure vessel containing, for example, petroleum gases under superatmospheric pressure. Attached to a flange 2 of the vessel is a safety relief valve 3 of well-known type wherein a valve disc 4 is normally maintained on an annular seat 5 by means of a coil spring 6 mounted on a stem 7 between plates or spring buttons 8. An adjusting screw 9 mounted in the bonnet 10 of the valve is used to set the pressure to that desired to be maintained in the pressure vessel 1. The body of the valve is provided with a flanged discharge opening 11 which leads from the chamber in the body above the valve disc 4.

The flanged opening 11 is connected with a flanged L-shaped vent pipe 12 by suitable connectors such as bolts and nuts. The vent pipe 12 is provided in its horizontally directed portion with an orifice in which is threaded a removable metering plug 13 having a bore 14 of suitable diameter. The vent pipe is directed upward and ends in a vertical opening 15. Fitted in the bore of the vent pipe is a flexible inflated plug of suitable material such as a gas-filled rubber ball 16 as shown in FIG. I. Instead of a ball a flexible inflated cylindrical, closed-ended element 16a as appears in FIG. III might be substituted. The ball 16 is tethered by means of a light chain 17 attached to its upper exterior surface and a collar 18 surrounding the vent pipe near its upper end.

While I have used a synthetic rubber ball with success when the vented gases are of petroleum origin, with other vapors or gases, other elastomers may possibly be used, provided the exposure to the gases or vapors handled does not rapidly deteriorate the wall of the plug. The particular elastomer chosen should be resistant to sunlight and also resistant to the temperature conditions to which the inflated flexible plug is to be exposed.

The operation of the invention is as follows: Upon the pressure within the vessel 1 slightly exceeding the set pressure on the safety relief valve 3, the valve disc 4 will lift from the seat 5 allowing gas to pass between the seat and the disc. This gas will flow along the inside of the vent pipe 12 and will pass through the central opening 14 of the metering plug 13 because the ball 16 completely plugs the outlet 15 from the vent pipe 12. Upon the pressure in the vessel 1 becoming high enough to lift the valve disc further off its seat, the volume of gas released will be more than can be handled at once by the orifice so that the pressure in the vent pipe will rise to such extent that the ball 16 will be blown out of the end of the vent pipe through the opening 14. As will be seen from FIG. II the exposed tethered ball can readily be viewed by operating personnel.

As an example of the use of the invention I would mention that in one installation of the device the orifice in the wall of the vent pipe was of such size that an accepted leakage of .014 cubic ft. per sec. was handled. Upon a larger amount of gas leaking into the vent pipe the pressure built up to 2 lbs. per square inch. At this point the inflated rubber ball was ejected from the end of the vent pipe.

As will be appreciated by those concerned with the operation of pressure vessels, this invention offers several advantages. The device can be readily installed in any open vent pipe without shutting down the pressure unit to which it is attached. The device readily permits operators of plants to check for excess valve leakage without climbing to the top of columns or other pressure structures.

By means of this device quantities of valuable special products can be prevented from being lost to the atmosphere. Furthermore, by the use of this device the pollution of the atmosphere by leakage of vapors and gases can be reduced in that an excessive leakage situation can be readily observed and steps taken to obviate this undesirable condition.

I claim as my invention:

1. In combination with a pressure relief valve, a device for detecting leaks from said relief valve comprising: an atmospheric vent pipe attached to the discharge side of said relief valve, a metering orifice open at all times in the wall of said vent pipe in communication between the interior of the vent pipe and the atmosphere outside thereof, and a flexible inflated plug of elastomer fitted in the bore of the vent pipe at the open, upwardly directed end thereof.

2. A device as in claim 1 in which the flexible inflated plug is a ball.

3. A device as in claim 1 in which the flexible inflatable plug is cylindrically shaped with rounded ends.

4. A device as in claim 1 in which the inflated plug is tethered to the vent pipe.

5. A device as in claim 1 in which the metering orifice in the wall of the vent pipe is a removable sleeve having a bore of specified dimension.

References Cited in the file of this patent
UNITED STATES PATENTS

| 586,038 | Hope | July 6, 1897 |
| 1,132,793 | Polo | Mar. 23, 1915 |

FOREIGN PATENTS

| 809,742 | France | Dec. 12, 1936 |